United States Patent [19]

Hou et al.

[11] 4,361,486

[45] Nov. 30, 1982

[54] FILTER MEDIA, METHOD FOR OXIDIZING AND REMOVING SOLUBLE IRON, METHOD FOR REMOVING AND INACTIVATING MICROORGANISMS, AND PARTICULATE FILTER AID

[75] Inventors: Kenneth C. Hou, San Antonio, Tex.; Timothy J. Webster, Norfolk, Conn.

[73] Assignee: AMF Incorporated, White Plains, N.Y.

[21] Appl. No.: 258,247

[22] Filed: Apr. 28, 1981

[51] Int. Cl.³ .................... C02F 1/50; C02F 1/72; B01D 39/18
[52] U.S. Cl. .................... 210/722; 210/759; 210/764; 210/501; 210/504; 210/505
[58] Field of Search ............ 210/679, 680, 722, 759, 210/764, 777, 778, 807, 504, 506, 507, 508, 509, 501

[56] References Cited

U.S. PATENT DOCUMENTS

| | | | |
|---|---|---|---|
| 850,606 | 4/1907 | Schroeder | 210/759 |
| 975,405 | 11/1910 | Eile | 210/759 |
| 1,253,840 | 1/1918 | Kobelt | 210/722 |
| 4,007,113 | 2/1977 | Ostreicher | 210/504 |
| 4,007,114 | 2/1977 | Ostreicher | 210/502 |
| 4,293,426 | 10/1981 | Gago | 210/759 |

FOREIGN PATENT DOCUMENTS

| | | | |
|---|---|---|---|
| 52-23860 | 2/1977 | Japan | 210/759 |
| 55-132607 | 10/1980 | Japan | 210/759 |

*Primary Examiner*—Ernest G. Therkorn
*Attorney, Agent, or Firm*—David E. Dougherty; Michael E. Zall

[57] ABSTRACT

A filter media is provided which comprises an amount of particulate immobilized in a substantially inert porous matrix. A least a portion of the particulate surface has thereon a divalent metal peroxide. The metal peroxide is magnesium peroxide or calcium peroxide, preferably magnesium peroxide.

The filter media is preferably used for oxidizing and removing soluble iron and manganese from an aqueous fluid. The filter may also be used for removing and inactivating microorganisms from fluids, e.g. aqueous fluids. Particulate filter aid having coated or adsorbed on the surface the aforementioned metal peroxide may be used as the particulate in the filter media, as well as the metal peroxide in particulate form.

38 Claims, 9 Drawing Figures

E. coli

P. cepacia

P. aeroginosa

P. aeroginosa

S. Marcens

MS-2 Coliphage

SA-11 *Rotavirus*

FIG. 9

FILTER MEDIA, METHOD FOR OXIDIZING AND REMOVING SOLUBLE IRON, METHOD FOR REMOVING AND INACTIVATING MICROORGANISMS, AND PARTICULATE FILTER AID

BACKGROUND OF THE INVENTION

1. FIELD OF THE INVENTION

This invention relates to a novel filter media and its uses; more particularly, this invention relates to a filter media useful for oxidizing and removing soluble iron and manganese and/or removing and inactivating microorganisms from fluids, particularly aqueous fluids.

2. PRIOR ART

Soluble iron, usually as a solution of ferrous bicarbonate, is a common contaminant in water supplies, particularly well water. Soluble iron in excess of 0.3 parts per million can cause undesirable taste and odor, discoloration of washed clothes, discoloration of plumbing fixtures, incrustation in water systems, discoloration of manufactured products such as textiles or paper, and other problems. These problems generally arise when the water contacts air, chlorine, and/or other chemicals capable of oxidizing the soluble ferrous ion ($Fe++$) to the less soluble ferric state ($Fe+++$). Hydrous ferric oxide, i.e. ferric hydroxide, is formed which is essentially insoluble in water and is thus precipitated in the water by the oxidation reaction. This is the familiar red-brownish, or rusty appearance on sinks, swimming pools, clothing and the like.

Along with the soluble iron contaminants, a water supply may also contain insoluble iron, as well as dissolved manganese and other undesirable soluble contaminants, e.g. copper, chromium, and hydrogen sulfide. All of these soluble contaminants may also be present in their colloidal form.

It has been the practice in the past to utilize an oxidizing agent for the purpose of oxidizing the soluble iron (and other contaminants) to a condition in which they can be precipitated and subsequently removed from the water. Among such oxidizing agents are the various permanganates, such as those of potassium or calcium, hypochlorides and chlorine. Such oxidizing agents will oxidize, for example, soluble iron, however, such agents introduce objectionable residues into the water and/or are inconvenient for use, particularly, for example, in a residential environment. Thus, for example, the permanganates introduce soluble manganese salts into water, while chlorine and the hypochlorides introduce objectionable tastes and odor. Such residues are difficult to remove and for this reason the use of such oxidizing agents for the purification of water has been distinctly limited. Furthermore, it has been recently discovered, that chloroform, which may be produced through the chlorination of water, is a carcinogen. The potential for introducing such a residue into a water system makes the chlorination of water a less desirable means for oxidizing contaminants such as soluble iron. The use of oxidizing agents which do not introduce objectionable residues into the water, such as hydrogen peroxide, are inconvenient to use, particularly in a residential environment.

For example, the chlorination of water followed by filtration has been commercially used for the removal of both soluble and insoluble iron. Chlorine, for example in the form of sodium hypochloride, is injected into the water contaminated with iron. The iron is oxidized and allowed to precipitate and flocculate to a size large enough for removal by subsequent filtration. The shortcomings of this system, in addition to the aforementioned, are (1) three pieces of equipment are required, i.e. a metering pump, a holding tank and a filter; and (2) a 30 minute retention time is generally required for flocculation—this would require a holding tank of about 300 gallons if flows of 3 gpm are required. Such a system would be particularly undesirable in a residential environment.

Aeration of water followed by filtration has been an extensively used method for reducing the quantity of metallic impurities present in water, but even under the most effective conditions, aeration will remove only from 80 to 90 percent of the soluble iron. Again such a procedure is completely unacceptable for use in a residential environment and requires at least two separate process steps as well as a retention time for flocculation.

Other attempts at removing soluble iron have involved, for example, the use of ion exchange beds, i.e. water softening. Such a method is perhaps one of the most widely used methods for iron removal. The method, however, is only recommended for the removal of soluble iron. The process requires charging an ion exchange material, such as sulfonated polystyrene resins, with sodium ions ($Na+$), preferably using sodium chloride (salt). As the soluble iron contaminated water is passed thru the resin bed the iron ions are exchanged for sodium ions which are released into the water. The short-comings of this system are that the resin also exchanges other multivalent positive ions in the water for sodium ions. This greatly reduces the life of the resin and produces an unnatural water supply wherein all the positive ions are sodium. This can present a health hazard to people on low sodium diets. Also, the backwash from the regeneration process may present problems to sewers and septic systems and contaminate surface and ground waters with salt. The contaminated water may also require pretreatment with sequestering or chelating agents, e.g. polyphosphates, to prevent the precipitation of iron onto the resin. Thus ion exchange methods for the removal of iron are expensive, inefficient and generally not suitable for use in a residential environment.

Another commercial process for removing soluble and insoluble iron from water is the "greensand filter" method. Generally, the process requires charging manganese greensand (i.e. modified New Jersey Gluconite sand) with potassium parmanganate. As the iron contaminated water is passed thru this greensand bed the soluble iron is oxidized by the permanganate to the insoluble form and filtered through the deep bed. The short-comings of this process are (1) the system has a very low capacity and short life requiring frequent backwashing and regeneration—this may present problems to sewers and septic systems and contaminate surface and ground waters; (2) the oxidation, flocculation and filtration reaction time for soluble iron is long, requiring a bed depth of at least 24 inches; and (3) the potassium permanganate used for regeneration is hazardous and inconvenient to use.

Another similar method of removing iron from water, which has only limited application, involves passing the contaminated water through a granular bed of partially calcined dolomitic lime—calcium magnesium carbonate. However, even with the use of filter aid, it is sometimes difficult and economically impossible to reduce the amount of iron in water supplies to an acceptable level.

Thus it can be seen that the aforementioned methods for removing soluble iron from water may require at least two process steps, i.e. pretreatment with an oxidizing agent followed by removal of the oxidized iron, long reaction times and complicated and expensive process equipment.

Additionally, such devices can experience long periods of non-use which can result in the build up of microorganism populations. Subsequent process steps and equipment can be used to remove such microorganisms, making the system even more complicated and expensive.

The destruction of microorganisms, e.g. rickettsiae, bacterium, protista, virus, through the application of filtration or chemical compounds is known. For example, it has long been recognized that low concentrations of silver ions or silver bearing materials that yield silver ions will combine with the sulfhydryl groups in bacteria and other microorganisms to form stable silver-sulfur complexes within the cell. Such complexes block oxidative reactions and hydrogen transfer within the cell resulting in the eventual death of the cell. Practical application of this knowledge to potable water is seriously limited by the fact that excessive concentrations of silver may be harmful to humans and to domestic animals and by the physical difficulty of maintaining an effective and safe concentration of active silver in water.

The destruction of microorganisms through the application of oxidizing substances, such as chlorine, oxygen and ozone has long been the practice for disinfecting drinking water, swimming pool water and the treatment of sewerage. However, conventional oxidizers are subject to a number of disadvantages. For example, both chlorine and ozone must be fed continuously into the water and in time both lose their oxidizing power. Furthermore, as indicated, previously, it has been discovered that chloroform produced through the chlorination of water, is a carcinogen. Chlorination has thus become a less desirable form of disinfecting potable water. As an alternative to chlorine the use of ozone ($O_3$) has recently come into prominence. While ozone is a very effective oxidizing agent, it is chemically unstable and must be generated continuously at the point of application. The generation of ozone requires a corona discharge of high voltage electricity. The use of ozone for the treatment of water supplies thus becomes uneconomical and impractical, particularly in a residential environment.

The use of filters to mechanically remove microorganisms such as bacteria, is known. Such filters exhibit a short life due to pore blockage and exceedingly low rates of filtration due to the small pores required to filter such microorganisms. Attempts to minimize these problems by charge modifying the filter media through various means to enhance the capture potential of the filter media, have met with various degrees of success—see, for example: U.S. Pat. Nos. 4,007,113 and 4,007,114 to Ostreicher; copending U.S. Ser. No. 164,797, filed on June 30, 1980, and 147,975, filed on May 8, 1980 and 123,467, filed Feb. 21, 1980, all to Ostreicher et al; U.S. Ser. No. 201,366 filed Nov. 27, 1980 to Emond et al; and ZETA-PLUS(R) and ZETAPOR(TM) filter media sold by AMF Cuno, Meriden, Connecticut. Such filter media, however, tend to be too expensive and impractical for a residential environment.

More specifically, methods of removing iron from water are described in the following U.S. Pat. Nos.:
1,253,840 to Kobelt;
2,237,882 to Lawlor et al;
2,311,314 to Reichert et al;
3,102,789 to Pirsh et al;
3,167,506 to Fackler et al;
3,192,156 to Joyce;
3,222,277 to Joyce;
3,235,489 to Bell et al;
3,259,571 to Marshall et al, and
3,399,136 to Bell.

Methods of inactivating and removing microorganisms from fluids are described in the following U.S. Pat. Nos.:
850,608 to Schroeder;
975,405 to Eilertsen;
1,082,315 to Gans
1,473,331 to Bechhold;
1,557,235 to Bechhold;
1,734,197 to Blumenburg;
2,008,131 to Dieck et al;
2,066,710 to Bado;
3,248,281 to Goodenough;
3,268,444 to Reun;
3,872,013 to Nishino et al; and
4,071,636 to Nishino et al.

Kobelt describes a process for removing manganese and iron from water which requires adding to the water soluble permanganate and subsequently filtering the water through an "... extremely intensely acting..." catalytic body of high porosity. The catalytic body is mixed with a material capable of generating oxygen when reacted with the water. Materials capable of generating oxygen are said to be peroxides of metals insoluble in water. It is stated that these peroxides when present in the catalytic body accelerate and complete the conversion of the iron and manganese existing in the water into oxide and hydrates insoluble water so that they may be completely separated by the catalytic body. The catalytic bodies that may be used are said to be trachytes or their tuffs, and similar volcanic rocks. A volcanic scoria or gravel having mud deposited thereon may also be used.

Fackler et al, describes a process for the removal of iron and manganese, similar to a "greensand filter" but which requires adding permanganate to the water as it is being fed to a manganese oxide zeolite filter bed. The filter medium described for removing the oxidizables from the water may contain a large proportion of the higher oxides of manganese, i.e. an oxidation number of about 4.

Both Joyce references describe percolating a hydrogen sulfide containing water through a bed of activated carbon which is impregnated with manganese dioxide. Hydrogen sulfide is removed from the water. The water is then passed through a cation exchange water softener to remove the water soluble manganese and iron compounds. It is said to be critical that the activated carbon be impregnated with manganese dioxide and not merely coated therewith. It is therefore necessary to form the manganese in situ, e.g., passing an aqueous solution of an alkaline metal permanganate through the activated carbon.

Marshall et al, describes a process for removing soluble iron from water which requires adding powdered active magnesium oxide and pulverulent filter aid to water, mixing for a period of time, "... up to say 10 minutes . . ." and then passing the mixture through a filter. The filter aids are described as diatomaceous silica, perlite, siliceous material, carbon and fiber matter, such as asbestos and cellulose. The magnesium oxide may be in the form of calcined magnesite or partially calcined dolomite.

Gans, describes the sterilization of water by filtration over oxides of manganese in conjunction with zeolites, or after the addition of excess permanganates, filtration over reduced oxides of manganese in conjunction with zeolites. Gans purifies water by producing in the water a colloidal solution of manganese and subsequently filtering it over an oxide of manganese. The colloidal solution of manganese is produced by the addition of permanganates to the water.

Dieck et al, describes sterilization of liquids by contacting the liquid with a silver oxide compound and manganese oxide. It is contemplated by Dieck et al that this composition may be embedded in a finely divided form in or upon porous substances such as filter candles. The filter materials can be produced by adding the pulverulent composition to a porous substance and then forming filter plates.

Bell, describes purifying water contaminated with bacteria and virus by adding iron or aluminum to the water to combine with the bacteria and viruses. The iron or aluminum is then removed by adding a filter aid and a compound such as magnesium oxide which will unite with the iron or aluminum iron to form a substance which can subsequently be removed by filtration.

As can be seen from the foregoing, most of the methods for effectively oxidizing and removing soluble iron and/or effectively removing and inactivating microorganisms cannot be accomplished with a single process step or filter media. All of the aforementioned methods require numerous process steps, e.g. pretreatment, retention time, filtration, etc., to be completely effective. All of these are therefore comparatively expensive and complicated, and in particular are impractical in a residential environment, where simplicity and cost are key factors.

OBJECTS AND SUMMARY OF THE INVENTION

It is an object of this invention to provide a filter media capable of simultaneously oxidizing soluble iron contained in an aqueous fluid to insoluble iron and removing the insoluble iron from the fluid.

It is a further object of this invention to provide a filter media for simultaneously removing and inactivating microorganisms contained in a fluid.

It is a further object of this invention to provide a filter media having an electropositive capture potential and oxidizing capability for contaminants contained in a fluid.

It is a further object of this invention to provide a simple one step method for simultaneously rendering soluble iron contained in an aqueous fluid insoluble and removing the insoluble iron from the fluid.

It is still a further object of this invention to provide a simple one step method for simultaneously removing microorganisms from a fluid and rendering them inactive.

It is still a further object of this invention to provide a method for producing water having an extremely low iron content, less than 0.3 ppm, and excellent taste, odor and appearance from water having a high soluble iron content.

It is still a further object of this invention to provide a method for producing water having an extremely low microorganism content and excellent taste, odor and appearance from water in which the microorganisms are contained.

It is still another object of this invention to provide a practical means of removing microorganisms from water sources to render them useful for both potable and sensitive industrial purposes.

It is still a further object of this invention to provide a particulate filter aid having adsorbed thereon a compound suitable for the oxidation of soluble iron and inactivation of microorganisms.

It is still a further object of this invention to provide a particulate filter aid for use in filter media suitable for the oxidation and removal of soluble iron from water contaminated therewith, and/or the removal and inactivation of microorganisms from water contaminated therewith.

It is still a further object of this invention to provide a method for simultaneously oxidizing and removing soluble iron and manganese and inactivating and removing microorganisms from water contaminated therewith.

The foregoing objects and others are achieved by a novel filter media. The filter media comprises an amount of particulate immobilized in a substantially inert porous matrix. A least a portion of the particulate has on its surface a divalent metal peroxide of:

(a) magnesium peroxide ($MgO_2$) or
(b) calcium peroxide ($CaO_2$).

The amount of peroxide on the particulate surface when the filter media is used for oxidizing and removing soluble iron, is an amount sufficient to oxidize the soluble iron contained in the aqueous fluid which is passed through the filter media. Contact of the magnesium or calcium peroxide with the soluble iron substantially instantaneously forms an insoluble iron which is removed by the filter media. Thus the soluble iron contained in the water with a single process step and filter media is simultaneously oxidized and removed from the aqueous fluid. The filter media can be in thin sheet form due to the unexpected substantially instantaneous oxidation of the soluble iron. The amount of peroxide on the particulate surface when the filter media is used for removing and inactivating microorganisms is sufficient to inactivate the microorganisms captured by the filter media when the fluid is passed through the filter media. Thus the filter media removes, i.e. captures, the microorganisms from the fluid and subsequently inactivates them.

It has generally been found that a filter media having at least about one percent divalent metal peroxide by weight of the media, can be used for both oxidizing and removing soluble iron and removing and inactivating microorganisms. Preferably the filter media contains from about 5% to 70% divalent metal peroxide by weight of the filter media.

The preferred divalent metal peroxide is magnesium peroxide. However, both the magnesium and calcium peroxides appear to substantially instantaneously oxidize the soluble iron to its insoluble form to permit the insoluble form to be captured by the same filter media containing the divalent metal peroxide. Other type oxidizing agents appear to require greater reaction times and/or have other undesirable properties.

A further aspect of this invention is to provide a filter media having an electropositive potential, i.e. an electropositive capture potential. This may be accomplished by modifying the surface of the particulate or the inert porous matrix with various surface modifying agents, for example melamine formaldehyde cationic colloid, inorganic cationic colloidal silica, or polyamido-polyamine epichlorhydrin cationic resin, among others. Such an electropositive filter media provides enhanced filtration performance or capture potential for the removal of submicron contaminants from aqueous systems, and in particular enhances the removal of the insoluble iron formed and/or the microorganisms contained in the fluid. Additionally, the electropositive filter media may enhance the rapid flocculation of the oxidized iron.

Another aspect of this invention is to provide a novel particulate filter aid which has coated or adsorbed on the surface a quantity of magnesium or calcium peroxide. Such filter aid may be used alone, for example, for oxidizing and removing iron and/or removing and inactivating microorganisms from contaminated water. Such filter aid, however, is preferably used to form the filter media of this invention.

This invention is further directed to methods for oxidizing and removing iron contained in an aqueous fluid and also to a method for removing and inactivating microorganisms contained in a fluid.

BRIEF DESCRIPTION OF THE DRAWINGS

Figure 9:
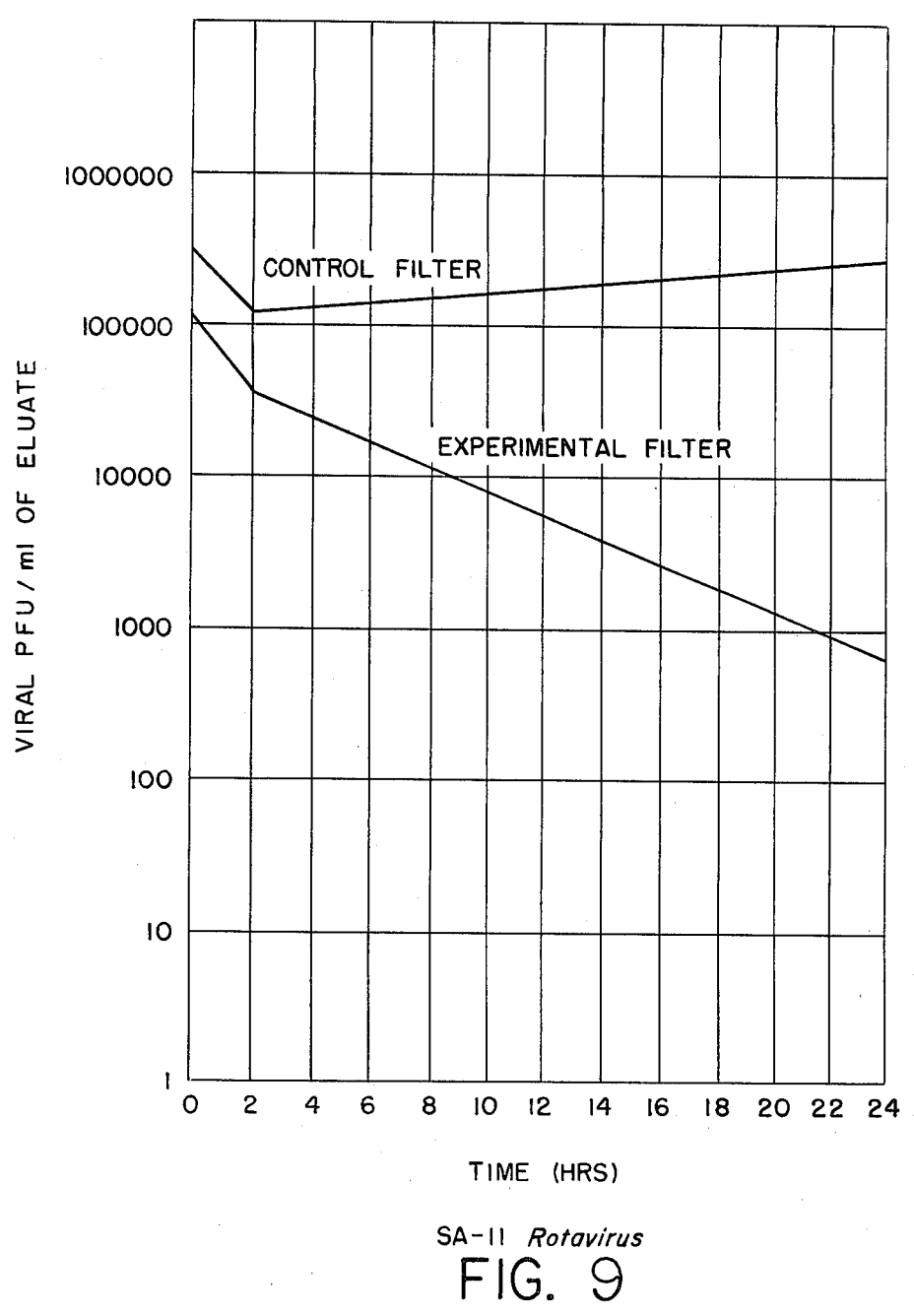

FIGS. 3-9 are a summary of the results of Example 30.

DETAILED DESCRIPTION OF THE INVENTION

Figure 1:
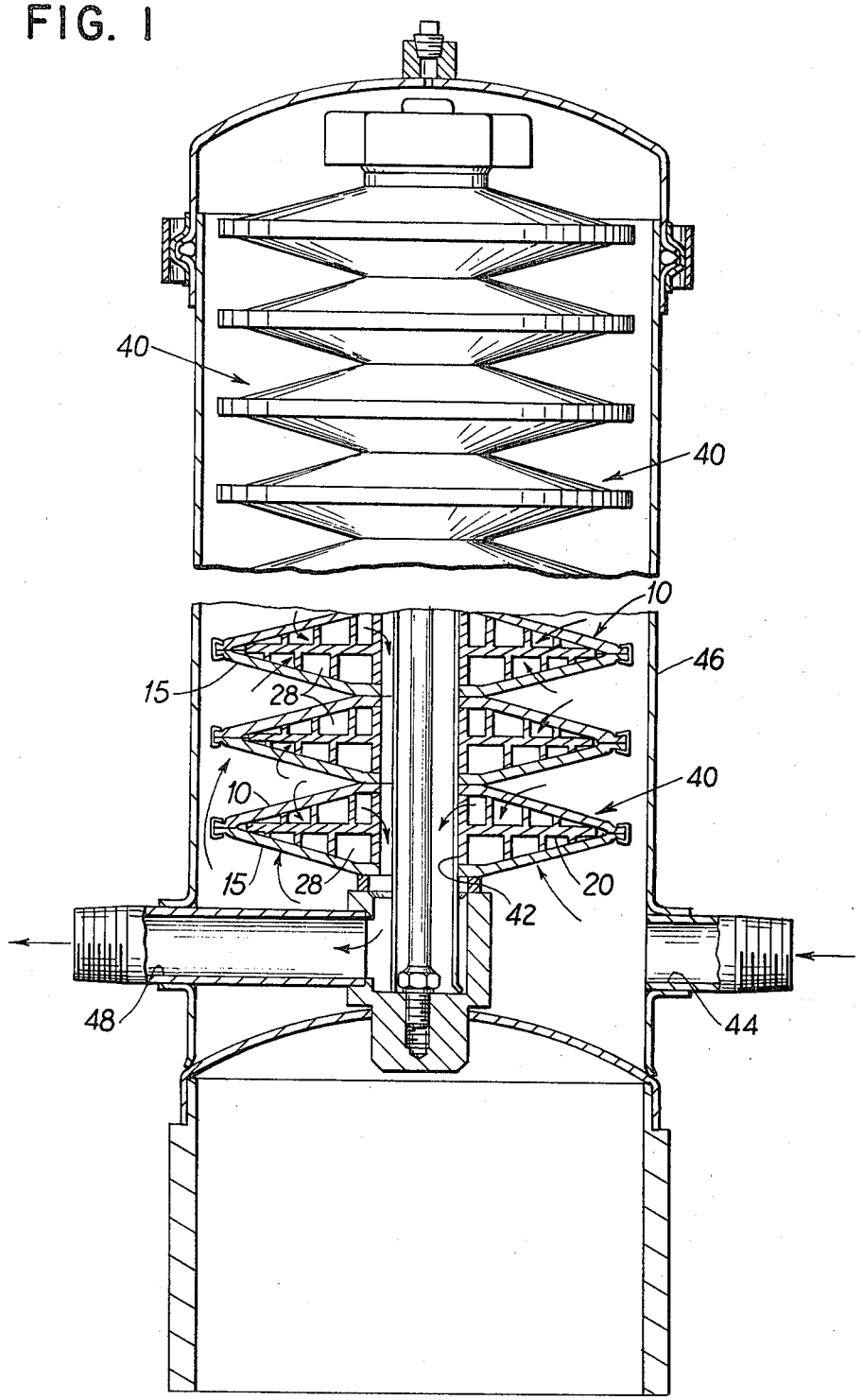
FIG. 1 is a longitudinal partial cross-sectional view of a preferred embodiment of a filter housing and filter cartridge comprised of a plurality of filter cells utilizing the filter media of this invention.

The filter media of this invention is comprised of an amount of particulate immobilized in a substantially inert porous matrix. At least a portion of the particulate surface has thereon a divalent metal peroxide of magnesium peroxide ($MgO_2$) or calcium peroxide ($CaO_2$).

The porous matrix may be any matrix material capable of immobilizing the particulate contained therein, i.e. capable of preventing particulate loss from the filter media, and have a porosity which enables the fluid (usually water) being filtered to pass through the filter media while holding back the captured particulate contaminants, e.g. insoluble iron and microorganisms. Preferably, the porous matrix is comprised of a self-bonding matrix of fibers. Suitable fibers which may be used in the present invention include polyacrylonitrile fibers, nylon fibers, rayon fibers and polyvinyl chloride fibers, cellulose fibers, such as wood pulp and cotton, and cellulose acetate. The preferred filter media of this invention has a porous matrix comprised of a self-bonding matrix of cellulose fibers.

In order to provide a matrix which is a coherent and a handleable structure for commerce and industry, it is desirable that at least one of the components which go into forming the porous matrix is a long, self-bonding structural fiber. Such fiber gives the filter media, e.g. filter sheet, sufficient structural integrity in both the wet "as formed" condition and in the final dried condition. Such a structure permits handling of the filter media during processing and at the time of its intended use. Such fibers are typically available in diameters in the range of 6 to 60 micrometers. Wood pulp, for example, has fiber diameters ranging from 15 to 25 micrometers, and fiber lengths of about 0.85 to about 6.5 mm.

When the amount of particulate immobilized in the porous matrix is low, i.e. less than about 50% by weight of the media, it is preferred that the porous matrix be formed of a self-bonding matrix of normal cellulose pulp having a Canadian Standard Freeness of +400 to +800 ml.

The state of refinement of wood pulp fibers is determined by means of a "freeness" test in which measurement of the flow rate through the fibers on a standard screen is determined. Two of the most common instruments for the freeness are the "Canadian Standard Freeness Tester" and the "Schopper-Ryegler Freeness Tester". For a more detailed explanation of these tests, see application U.S. Ser. No. 123,467 filed Feb. 21, 1980 to Hou et al, now U.S. Pat. No. 4,309,247, the entire disclosure of which is incorporated herein by reference. Typical or normal wood pulps show Canadian Standard Freeness Values ranging from +400 to +800 ml.

In the preferred embodiment of this invention it is desirable to have a high amount, i.e. greater than about 50% by weight of the filter media, of particulate immobilized in the porous matrix. It is thus highly desirable to use the invention described in the aforementioned U.S. Ser. No. 123,467, now U.S. Pat. No. 4,309,247, to maintain such high content of particulate in the filter media. Broadly, a minor portion of cellulose pulp refined to a Canadian standard freeness of between about +100 and −600 ml is incorporated with a major portion of the normally dimensioned cellulose pulp (+400 to +800 ml). In particular, from about 1% to about 10% of the refined pulp and about 10% to about 30% of the normal cellulose pulp, by weight of the filter media, is contained in the filter media, the remainder being the particulate. Generally, the weight ratio of unrefined to highly refined pulp will range from about 2:1 to about 10:1, preferably 3:1 to about 5:1. Such a mixture of pulps permits the retention of fine particulates up to about 70% or more by weight of the filter media.

Preferably, the filter media, and in particular the filter media sheet, is formed by vacuum-felting an aqueous slurry of such normal cellulose fibers, highly refined wood pulp and particulate. This forms a filter media sheet having the particulate immobilized in a porous matrix. The filter media sheet shows a uniform high porosity and fine pore-size structure with excellent filtration flow characteristics.

The amount of particulate in the filter media may be as little as 10% by weight of the filter media up to about 70% by weight. Generally, levels of about 50 to 70% by weight are employed.

At least a portion of the particulate contained in the filter media should have on its surface the divalent metal peroxide, i.e. magnesium peroxide or calcium peroxide. By the use of the term "have on its surface" or similar terminology, it is meant that the magnesium peroxide or calcium peroxide can be coated on the particulate, adsorbed in the particulate, bonded on the particulate, or be the particulate, per se. Thus, for example, a portion of the particulate in the filter media may be magnesium or calcium peroxide or may be particulate produced by depositing calcium or magnesium peroxide upon the surface of a particulate filter aid. Thus, for example, in one embodiment of the invention microcrystalline magnesium peroxide is deposited on a particulate filter aid, e.g. perlite or diatomaceous earth, which, in turn is incorporated in the filter media by methods previously discussed.

Optionally, although less preferably for the uses described herein, particulate filter aid having coated or adsorbed thereon calcium or magnesium peroxide, as well as particulate calcium or magnesium peroxide itself, may be used to form a filter bed. The particulate may also be included in conventional filter devices used for purifying water such as those described in U.S. Pat. Nos. 3,055,503 to Oliver and 2,081,353, 2,175,256 and 2,347,184 to Dick. The entire disclosures of all of these aforementioned patents are incorporated herein by reference.

Various types of particulate are suitable for inclusion in the filter media of this invention. Filter aids such as activated carbon, perlite, diatomaceous earth, colloidal silica, polymeric particulate, such as those produced by emulsion or suspension polymerization, etc. may be used. The particulate should have a specific surface area in excess of one square meter per gram and/or particle diameters less than about 50 microns, preferably about 3 to 50 microns. In a broad sense any fine particulate may be suitable. Particulate magnesium or calcium peroxide used in the filter media should also be of such size. From the standpoint of size, morphology, cost fluid compatability and general performance characteristics, the intermediate grades of diatomaceous earth and perlite filter aid exhibiting a mean particle size of less than about 15 microns are preferred. In many cases a mixture of more than one type of fine particulate such as diatomaceous earth/perlite give better filtration performance or better cost/performance characteristics than that achieved by use of any single type filter aid.

The filter media of this invention requires that at least a portion of the particulate used to form the filter media have on its surface the divalent metal peroxide. Preferably, at least about 5% by weight of the particulate has on its surface the divalent metal peroxide, and most preferably 35% to about 100%. It is preferred to have this portion of the particulate contained in the filter media consist of calcium or magnesium peroxide particles, per se. This provides an enhanced life for the filter media for it provides a greater quantity of calcium or magnesium peroxide for a given amount of particulate.

Preferably the amount of metal peroxide in the filter media is at least about 1% by weight of the filter media and preferably from about 5% to about 70% by weight of the media. The amount of divalent metal peroxide in the filter media is somewhat determined by the use of the filter media. For example, the amount of metal peroxide on the particulate surface when the filter media is used to oxidize soluble iron, should be sufficient to oxidize the soluble iron to its insoluble form to permit capture of the insoluble iron on the filter media. Such amount depends on the fluid volume to be processed, the soluble iron concentration in the fluid and other impurities contained in the fluid. When the filter media is to be used for inactivating microorganisms, the amount of peroxide on the particulate surface must be sufficient to inactivate the microorganisms which are captured by the filter media when the fluid is passed through the filter. Such amount depends on the concentration of microorganisms, the type fluid being passed through the filter media, e.g. water, air, etc., and the quantity of other impurities contained in the fluid. Generally, however, the aforementioned ranges i.e. at least about 1% by weight of the media and preferably from about 5% to about 70% by weight of the media, are sufficient to provide for both the oxidation and removal of iron from an aqueous fluid and the removal and inactivation of microorganisms from fluids.

It is also possible to use a mixture of calcium peroxide and magnesium peroxide in the filter media, however, for reason of cost, efficacy, etc., such mixtures are not preferred.

It is highly desirable to provide the filter media of this invention with an electropositive potential to enable the filter media to capture particulate contaminants, e.g. insoluble iron, microorganisms, by not only mechanical straining, but also by the electrokinetic capture of the contaminants. In filtration by mechanical straining, a particulate contaminant is removed by physical entrapment when the particle attempts to pass through a pore of smaller size. Electrokinetic capture occurs when the particle collides with the surface within the porous filter media and is retained on the surface by short range attractive forces. In addition to the electrokinetic capture of contaminants, it is believed that such electropositive potential on the filter media somehow assists in the rapid flocculation of oxidized iron as it passes through the filter media. Although Applicants do not wish to be bound by such theory, it is believed that the electropositive surface of the filter media attracts electronegatively charged ions or contaminants and concentrates the positively charged oxidized iron which is repelled by such surface. Such actions tend to promote flocculation.

Such concentration of oxidized iron can probably also be achieved by an electronegative potential on the filter media, see for example U.S. Ser. No. 188,142, filed Feb. 4, 1980 to Hou, et al, now U.S. Pat. No. 4,338,727; however, such electronegative potential is undesirable for the removal and inactivation of microorganisms.

Typically, an electropositive potential is provided to the filter media by modifying the surface of the particulate contained in the filter media or the porous matrix with an amount of a compound which provides a cationic charge to the surface of the particulate and/or matrix.

In the preferred embodiment herein, a filter media sheet is formed by vacuum-felting a cationically disperse aqueous slurry of normal or unrefined cellulose fibers, highly refined wood pulp and particulate at least a portion of which has on its surface the metal peroxide. The aqueous slurry includes therein a charge modifying agent. After vacuum-felting, the filter sheet is dried.

Particularly preferred charge modifying agents for use in the filter media of this invention are melamine formaldehyde cationic colloid, see U.S. Pat. Nos. 4,007,113 and 4,007,114 to Ostreicher; inorganic cationic colloidal silica, see U.S. Ser. No. 147,975, filed May 8, 1980 Ostreicher et al, now U.S. Pat. No. 4,305,782; and polyamido polyamine epichlorhydrin cationic resin, see pending U.S. Ser. No. 164,797, filed on June 30, 1980 to Ostreicher et al. The entire disclosures of all of these aforementioned patents and applications are incorporated herein by reference.

The most highly preferred charge modifying agent for use in the filter media of this invention is the organic cationic colloidal silica. The filter media produced is characterized by low organic extractables over a wide range of filtration conditions, and is particularly suitable for filtering potable water.

More specifically, the preferred inorganic cationic colloidal silica is an aqueous dispersion of positively charged colloidal particles consisting of a dense silica core coated with a positively charged polyvalent metal-oxygen compound typically stabilized with a counterion. Highly preferred materials are those disclosed in U.S. Pat. No. 3,007,878, the entire disclosure of which is incorporated herein by reference.

Other suitable cationic colloidal silica materials include those described in U.S. Pat. Nos. 3,252,917, 3,620,978, 3,719,607 and 3,956,171. The entire disclosures of all of the patents are incorporated herein by reference.

Preferred inorganic cationic colloidal silica charged modifiers are Wesol PA from Wesolite Corporation, Wilmington, Del.

Filter media prepared with the preferred cationic colloidal silica exhibit uniformly acceptable sterilization stability under stringent conditions, e.g., autoclaving at 15 psi, 121° C. for 1 hour, are particularly suitable for filtering potable water, and exhibits high wet strength.

Other charge modifying agents may be utilized to provide an electropositive potential to the filter media, for example, cationic organic polyelectrolytes. Such polyelectrolytes are well known in the art and include those described by M. F. Hoover in "Cationic Quaternary Polyelectrolytes—A Literature Review", J. Macromol. Sci. Chem. A 4, (6.) pp. 1327–1417 October (1970) and U.S. Pat. No. 3,354,424 to Guebert, et al the entire disclosures of which are incorporated herein by reference.

Generally, however, the specific choice of charge modifying agent depends upon many factors, including cost, fluid and temperature compatability, toxicology and supplementary functional attributes such as cross-linking characteristics with the porous matrix, e.g. cellulose, in addition to the primary filtration performance factors. Selection of suitable charged modifying agents, from the catagories specified above may be accomplished by methods well known to the art.

The amount of charge modifying agent employed is, generally, an amount which is sufficient to provide a cationically dispersed system when, for example, preparing a sheet by vacuum-felting. This will, of course, vary with the system and the modifying agent selected but can be readily determined by one skilled in the art. Thus, for a melamine formaldehyde colloid a 5% to 10% level, based upon the weight of the filter media, is found to be suitable whereas a 1% to 3% level is appropriate for a polyamide epichlorhydrin resin. In the case of highly preferred inorganic cationic colloidal silica, a 4% to 8% level gives the best results.

The sequence of adding the required components to water to form the preferred cationic dispersed slurry appears to be relatively unimportant provided that the slurry is subjected to high hydrodynamic shear forces during the mixing process. Preferably, the charge modifying agent if used, is added last. Preferably, refined pulp is added to a slurry of unrefined pulp, and then the particulate, including particulate having on its surface the metal peroxide is incorporated. The slurry is normally prepared at a 4% consistency and then diluted with additional water to the proper consistency required for vacuum-felting sheet formation. This latter consistency value will vary depending upon the type of equipment used to form the sheet. Typically, the slurry is vacuum-formed into a sheet and oven dried in a standard manner. The preferred filter media in sheet form has a thickness of about 0.100 inches (0.25 cm) to about 0.200 inches (0.50 cm) and/or a weight of about 0.7 to 1.3 gms/square inch, and most preferably about 1.0 gms/square inch.

The divalent metal peroxide, i.e. calcium peroxide and magnesium peroxide, used in the filter media of this invention is made by methods well known in the art. For example, magnesium peroxide can be made by reacting hydrogen peroxide, an alkali, and a soluble magnesium salt. Under careful drying conditions, a product approximating $MgO_2 \cdot H_2O$ can be obtained—see for example, Vannerberg, "The Formation and Structure of Magnesium Peroxide," *Arkiv Kemi* 14 99 (1959); Vannerberg, *Zhur, Prikliade Khim* 31, 1597 (1958) and Kirk-Othmer, Second Edition, Volume 14, 1967. All of these references are incorporated herein by reference.

Generally, magnesium peroxide of commerce is made by reacting a suitable grade of white magnesium oxide with strong aqueous hydrogen peroxide. The dried slurry can contain up to 50% $MgO_2$ with the balance being mostly MgO.

It has been found that the presence of magnesium oxide in the filter media causes a shift in filtered water to a high pH level, e.g. above about 10.5. Such a shift to such a pH is highly undesirable when such water is for consumption, i.e. potable water, and is also undesirable for industrial uses. It is therefore highly desirable to produce a magnesium peroxide which is free of magnesium oxide. A preferred process which can be used to produce such magnesium peroxide is described in French Pat. No. 1,524,632 to *Laporte Chemicals Ltd.* This process can produce a magnesium peroxide composition containing about 40 to 60 percent, by weight magnesium peroxide, the remainder being essentially magnesium carbonate. The process comprises reacting a solution of about 30% to about 50% hydrogen peroxide with previously dried magnesium carbonate. Hydrogen peroxide, as 100% $H_2O_2$, is used at about 4 to 15, and preferably about 6 to 8 times, the weight of magnesium in the magnesium carbonate. The magnesium carbonate and hydrogen peroxide are placed in a container and rapidly mixed to give an instantaneous uniform dispersion. The mixture is then dried on a tray.

It may be desirable, for example, to deposit the magnesium peroxide on particulate filter aid, e.g. perlite or diatomaceous earth, which in turn is incorporated in the filter media by methods previously described. This procedure can be performed, for example, by dispersing perlite in an aqueous solution of a magnesium salt, such as magnesium sulfate, followed by the addition of an alkali, e.g. ammonium or sodium hydroxide, together with hydrogen peroxide or a solid oxidizer such as ozone monopersulfate ($KOSO_4H$). The peroxide crystallites which form will be deposited on the perlite surface:

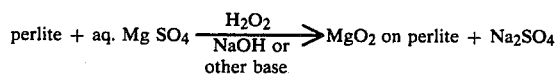

Calcium peroxide is best made by the reaction of hydrogen peroxide, alkali, and a soluble calcium salt, for example:

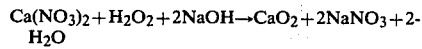

The insoluble peroxide can be filtered off and dried. The commercial product contains about 60% calcium peroxide, the balance being mostly calcium oxide, see *Kirk-Othmer, supra.*

The filter media of this invention are preferably utilized in sheet form having a thickness of from about 0.25 cm to about 0.50 cm and/or weight of about +0.7 to about 1. gm/square inch. Generally, such filter sheet may be used in a filter cartridge. The filter media may also be a porous tubular filter element produced in accordance with U.S. Pat. Nos. 3,995,076 to Sicard, 2,539,768 and 2,539,767 to Anderson, the entire disclosures of which are incorporated herein by reference.

Figure 2:
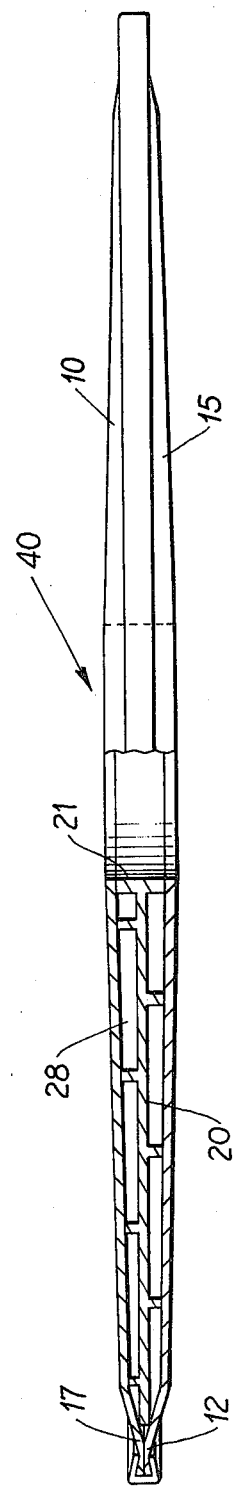
FIG. 2 is a cross-sectional view of an individual filter cell of the filter cartridge of FIG. 1.
Figure 3:
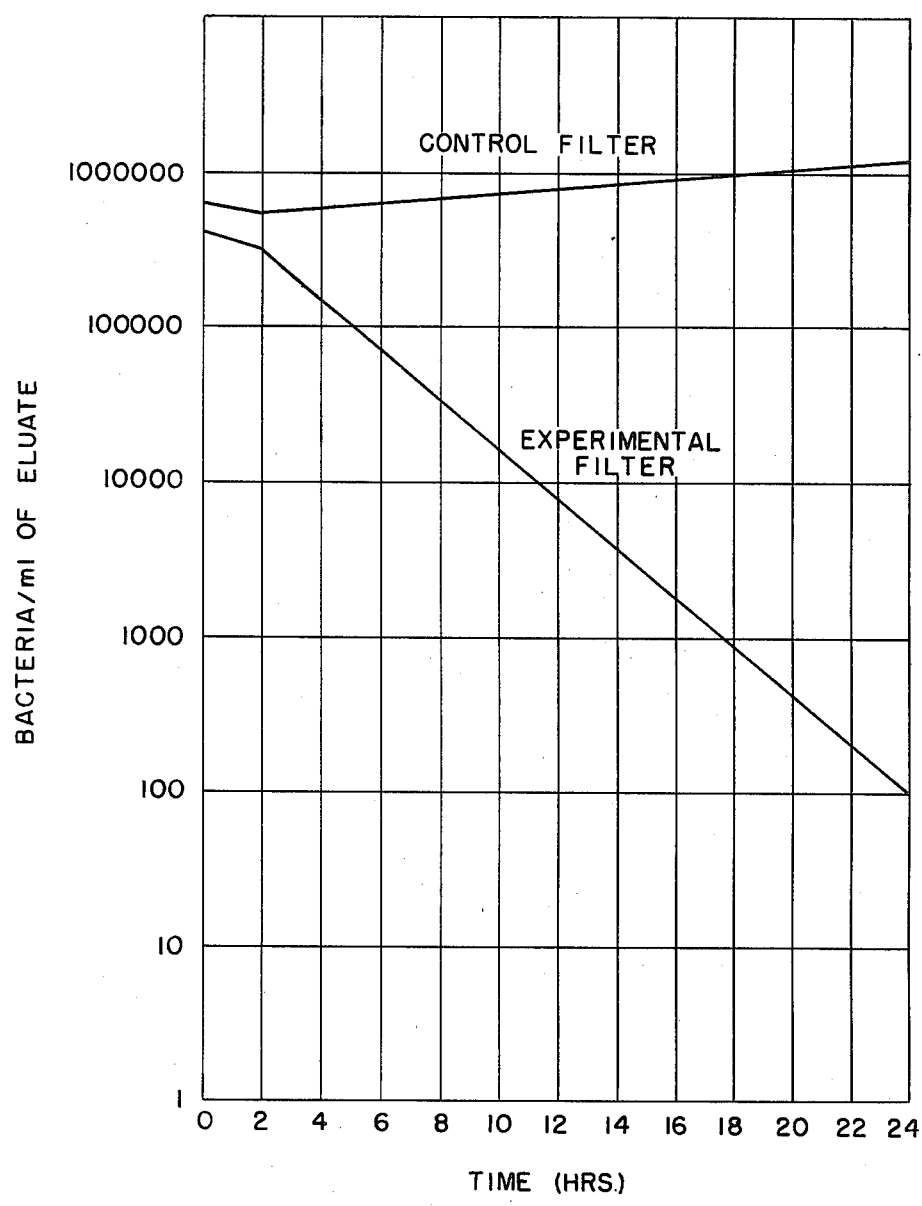
Figure 4:
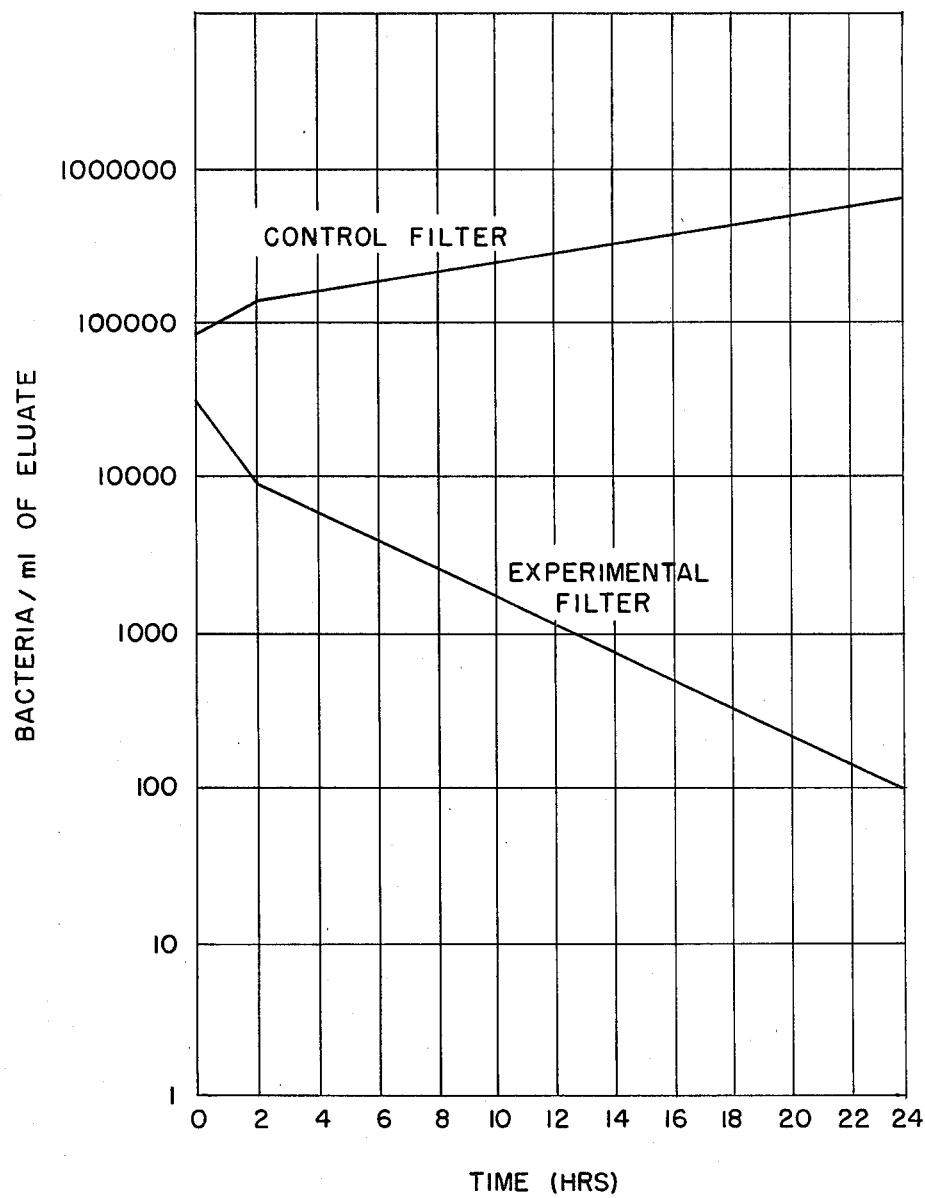
Figure 5:
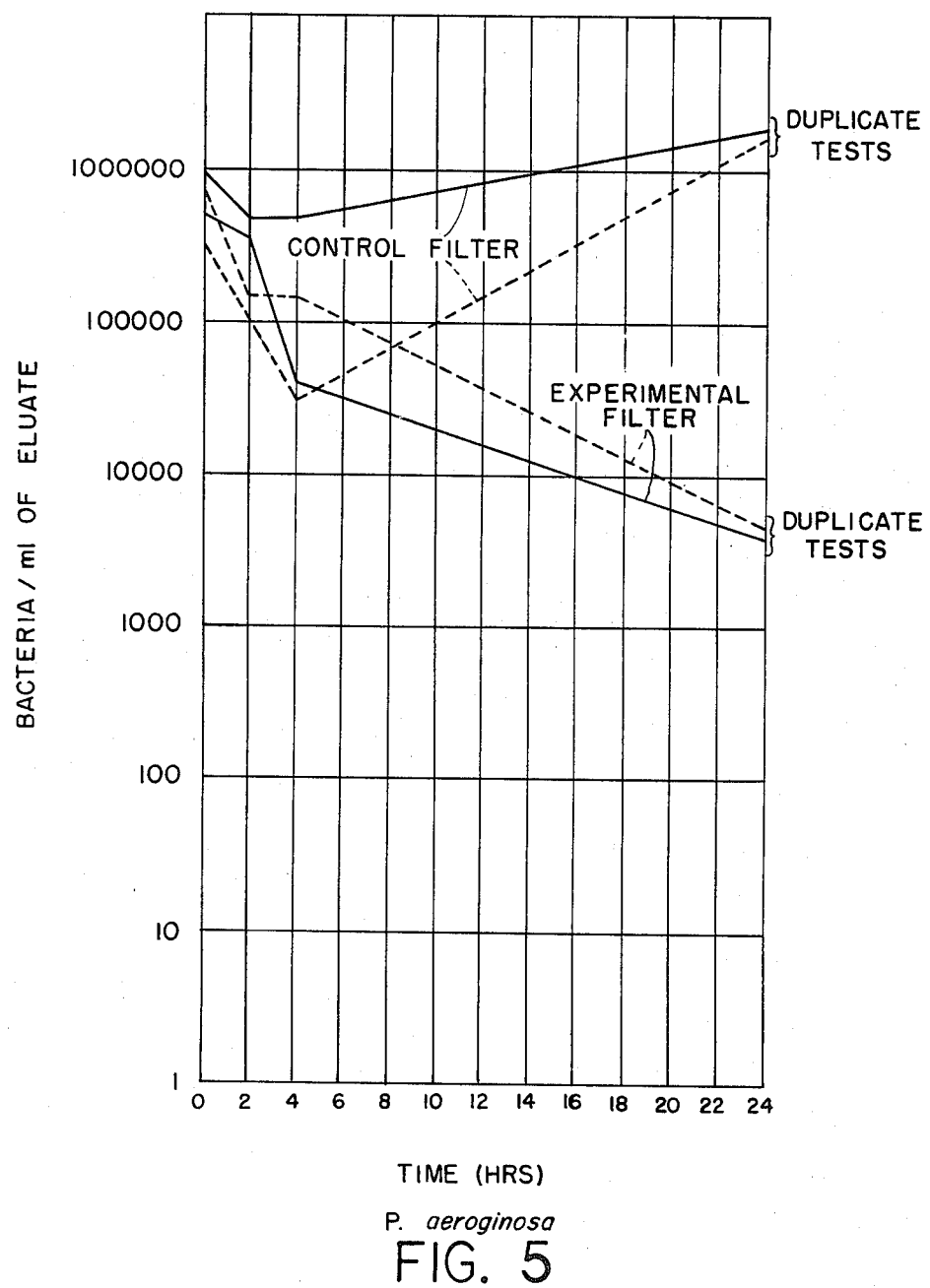
Figure 6:
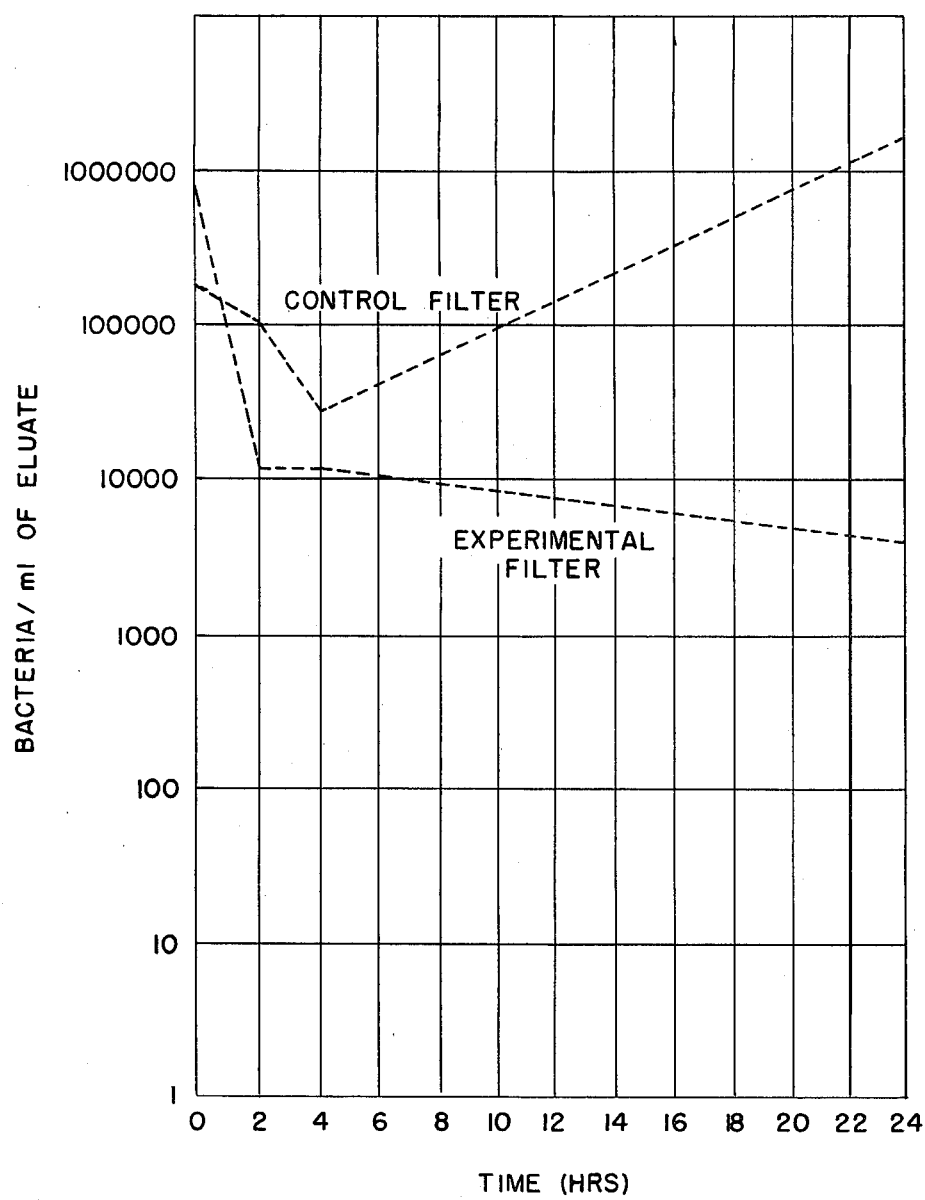
Figure 7:
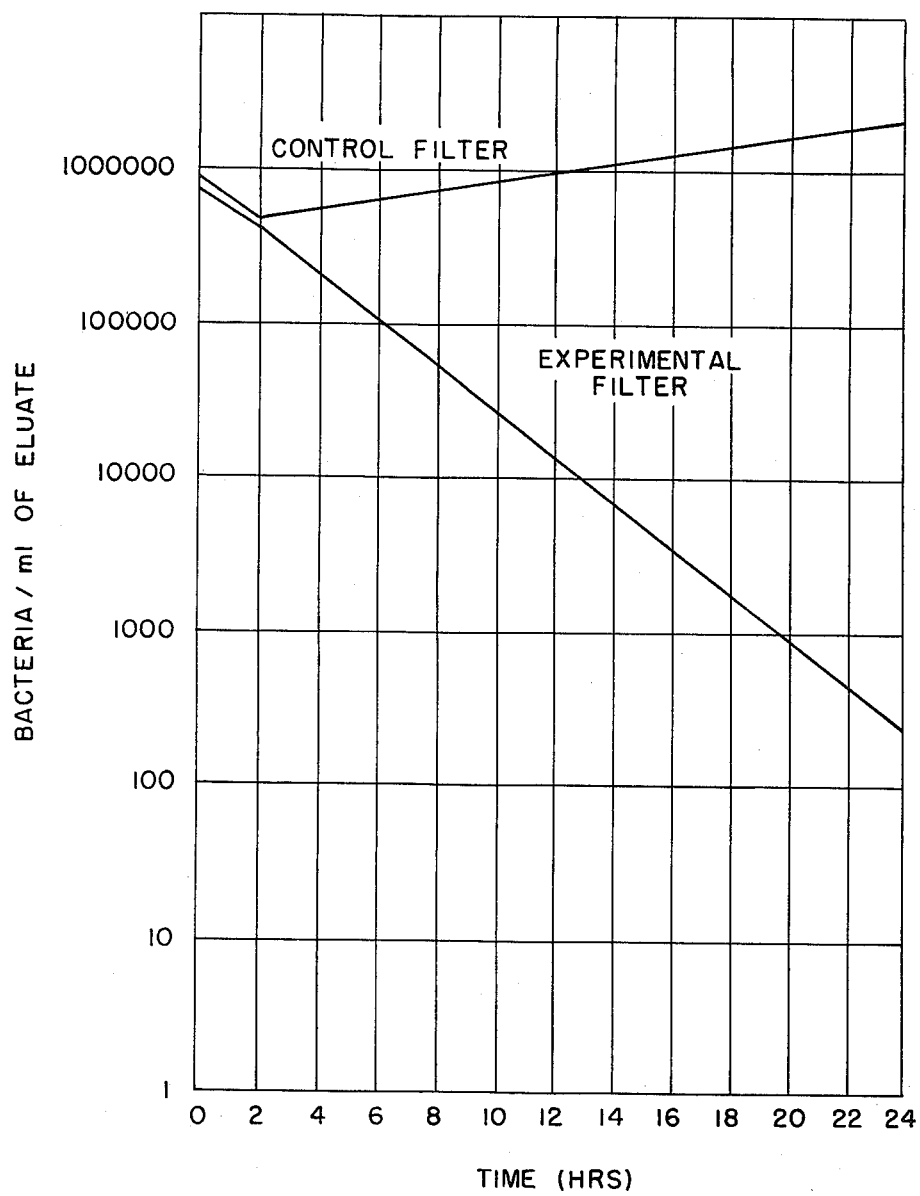
Figure 8:
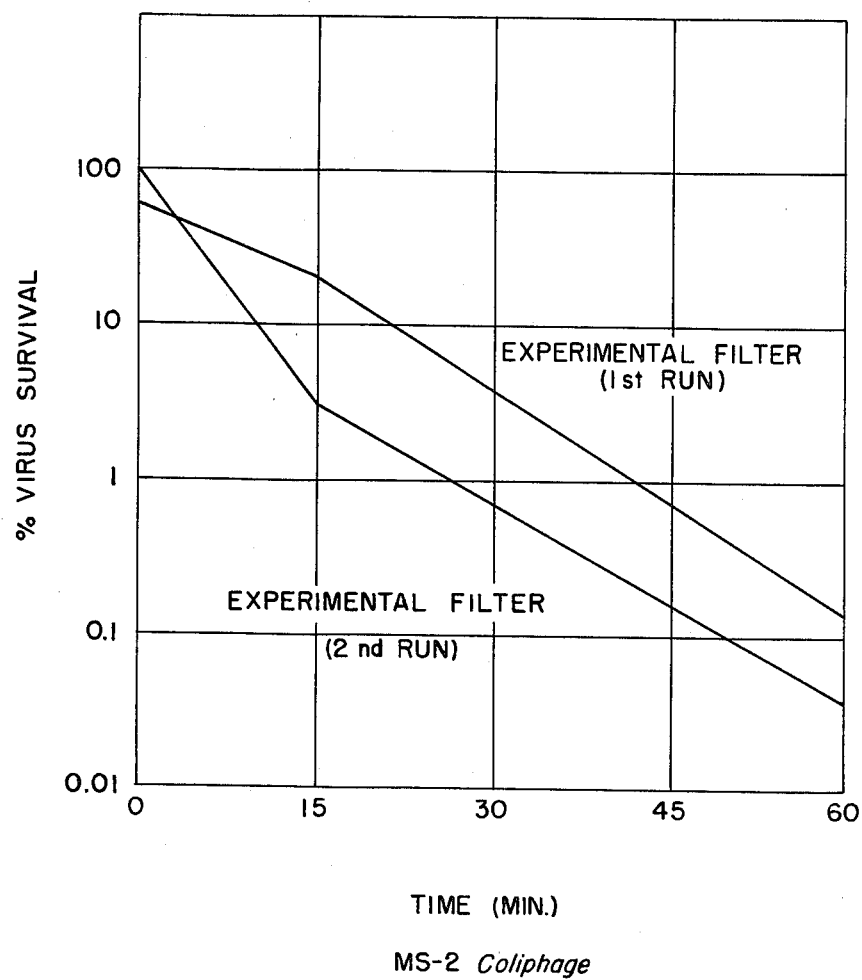

A highly preferred form of utilizing the filter media of this invention is to incorporate the filter media in sheet form in a filter cell which is used to form a filter cartridge. Such filter cartridges are of the type sold by AMF Cuno, under the trademark ZETA-PLUS. FIGS. 1 and 2 depict, respectively, such a filter cartridge and housing, and the filter cell. Referring to FIGS. 1 and 2, the filter cell (40), is comprised of two filter media (10 and 15), preferably in disc form having the flanges (12 and 17) in intimate face-to-face contact with each other. The filter media (10 and 15) and a spacer means (20) all having an axial or central opening (21) of the proper size which form a vertical conduit (42).

In operation the fluid is filtered by passing through in-take pipe (44) into housing (46). The The fluid passes from the outside of filter cell (40) through the filter media (10 and 15) to the space (28) formed by spacer means (20). Contaminants, e.g. insoluble iron and microorganisms are deposited on the outside and/or within the filter media (10 and 15) and the filtrate discharged through the discharge tube (48). Discharge tube (48) is in fluid connection with vertical conduit (42) which is in fluid connection with space (28) between the media (10 and 15).

A preferred way of producing such a filter cell is described in copending allowed application U.S. Ser. No. 253,345, filed Apr. 13, 1981 to K. Southall. The entire disclosure of this application is incorporated herein by reference.

The filter media of this invention may be used to oxidize and remove soluble iron from an aqueous fluid by passing the fluid through the filter media. Iron occurs in the water supply is basically two forms—soluble and insoluble form. The soluble is generally $Fe^{+2}$ and the insoluble is generally $Fe^{+3}$. The removal of soluble iron from a water supply is accomplished by first, oxidizing the soluble $Fe^{+2}$ to $Fe^{+3}$. The $Fe^{+3}$ form is insoluble and precipitates to form ferric hydroxide, $(Fe(OH)_3)$. The chemical reaction, for example, is described by the following equations:

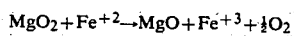

$$MgO_2 + Fe^{+2} \rightarrow MgO + Fe^{+3} + \tfrac{1}{2}O_2$$

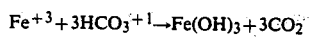

$$Fe^{+3} + 3HCO_3^{+1} \rightarrow Fe(OH)_3 + 3CO_2$$

The second stage is filtering out the oxidized iron. In prior art methods, a retention time of about 30 minutes is required for flocculation of the iron precipitate to a sufficient size to permit filtration. However, it has been found that the filter media of this invention has the ability to oxidize, flocculate and filter out iron almost instantly, e.g. less than one second, to permit filtration within a comparatively thin filter media. comparatively thin filter media.

The filter media of this invention also removes the soluble iron which has been oxidized, (i.e. insoluble iron) prior to passage through the filter media. Generally, the filter media of this invention may be used to reduce the soluble iron content of influent water from as high a level as 20 ppm, or greater, to a filtrate level of less than about 0.3 ppm. Manganese may also be reduced from such high levels to a level less than about 0.05 ppm.

The use of calcium and magnesium peroxide in the filter media of this invention, are particularly advantageous due to the non-toxicity of magnesium and calcium ions. This make the filter media of this invention suitable for use in filtering potable waters.

This method of oxidizing and removing soluble iron from aqueous fluid is superior to any existing technology. The process is less expensive in terms of capital investment, than any of the known processes and is much less complex than such processes. The process requires less frequent maintenance and monitoring and eliminates problems of liquid waste disposal, ground and surface water contamination, sewer and septic tank malfunctions, and chemical handling. The process concentrates the iron into a small solid filter media which can be disposed of in sanitary land fills or by iron recycling processes. It introduces no undesirable contamination, health hazards, or concentration of ions such as sodium, salt, manganese, permanganate, etc. The filter media of this invention permits the use of a very thin filter media, e.g. less than ¼ of an inch, as opposed to 24 inches for known ion exchange and greensand filter processes.

The filter media of this invention may also be used to remove and inactivate microorganisms from a fluid by passing the fluid through the filter media. Fluids from which microorganisms may be removed by the filter media of this invention are normally aqueous fluids; however, this invention contemplates the filtration of any fluid, with the understanding that the filter media must be compatible therewith.

The filter media and filter bed of this invention may also be used to oxidize other contaminants contained in the fluid. Examples of such contaminants are hydrogen sulfide, manganese, heavy metals (tin, lead, chromium, nickel, copper), cyanide and humic acid.

By the use of the term "substantially inert" as used to describe the porous matrix herein it is meant that the porous matrix does not chemically participate in the oxidation reaction.

The following examples are for the purpose of illustrating the invention in more detail, but are not to be taken as limiting thereof.

MAGNESIUM PEROXIDE

EXAMPLE A

Five (5) pounds of magnesium carbonate (MARINCO CH, heavy powder, food grade from Merck, Inc.) of −200 mesh (5 to 10 microns average size) was mixed with 6000 mls. of 50 weight percent hydrogen peroxide. After sufficient mixing time to insure even distribution of the particles in the liquid, the slurry was transferred to a stainless steel tray.

The tray was covered and placed in an oven at 150° C. until dry (less than 0.3% moisture). The product was 57% magnesium peroxide.

EXAMPLE B

Magnesium peroxide was prepared according to the process of the aforementioned Vannerberg by treating each gram of magnesium oxide at a temperature of about 0 C with about a 4 ml. of 30 weight percent aqueous hydrogen peroxide solution. After 24 hours, the concentration had increased to 1 ppm. The following is a summary of the results of such tests

OXIDATION AND REMOVAL OF SOLUBLE IRON

| EXAMPLE | KAMLOOPS (WT. %) | Refined Pulp −250 CSF (WT. %) | OXIDIZING AGENT TYPE | QUAN. | PARTICULATE TYPE | QUAN. | CHARGE MODIFYING AGENT TYPE | QUANTITY (WT. %) 1. | TOTAL THROUGHPUT (GALS.) |
|---|---|---|---|---|---|---|---|---|---|
| 1 | 28% | 2% | None | 0% | activated carbon | 70% | Wesol PA Cationic Colloidal Silica | 10% | 2.1 |
| 2 | 28% | 2% | $MgO_2$ (25% active) particulate | 10% | activated carbon | 60% | Wesol PA | 10% | 4.9 |
| 3 | 28% | 2% | $MgO_2$ (25% active) particulate | 20% | activated carbon | 50% | Wesol PA | 10% | 8.2 |
| 4 | 28% | 2% | $MgO_2$ (25% active) particulate | 35% | activated carbon | 35% | Wesol PA | 10% | 17.5 |
| 5 | 28% | 2% | $MgO_2$ (25% active) particulate | 50% | activated carbon | 20% | Wesol PA | 10% | 17.7 |
| 6 | 28% | 2% | $MgO_2$ (25% active) particulate | 60% | activated carbon | 10% | Wesol PA | 10% | 18.7 |
| 7 | 28% | 2% | $MgO_2$ (25% active) particulate | 70% | None | 0% | Wesol PA | 10% | 21.6 |
| 8 | 28% | 2% | $CaO_2$ particulate | 35% | Activated carbon | 35% | Wesol PA | 10% | 8.0 |

1. % charge modifying agent is weight % of total of KAMLOOPS, Refined pulp, oxidizing agent and particulate.

solid phase from the reaction mixture was filtered. The percentage of magnesium peroxide was determined by titration with permanganate. The magnesium peroxide content averaged about 40% by weight and was within 5 to 10 microns particle size.

OXIDATION AND REMOVAL OF SOLUBLE IRON

Filter Media

The following tests for the oxidation and removal of soluble iron were performed using a self-bonding matrix of cellulose fiber as the matrix of the filter media. Generally, the filter media was made by mixing normal or unrefined cellulose fiber, i.e. KAMLOOPS from Weyerhauser, Inc., −250 CSF refined cellulose pulp (made according to the procedure described in U.S. Ser. No. 123,467 now U.S. Pat. No. 4,309,247) diatomaceous earth, magnesium peroxide made pursuant to Example A., and charge modifying agent. All of the foregoing ingredients were mixed in a high shear mixer. When a uniform mixture was obtained the mixture was vacuum formed on a mesh screen and dried at 150° C.

EXAMPLES 1–8

Cellulose filter media were made varying the type and quantity of the various constituents therein. Each filter media was a single 2½ inch diameter disc having a thickness of from about 0.110 to about 0.170 inches. Each disc weighed about 0.8 grams/square inch. Each filter media disc was used to filter water contaminated with about 3.7 to 3.9 ppm soluble iron at about 1.7 gallons/min.-ft.$^2$ The level of soluble iron in the filtrate, after initial washout, dropped to a low level, i.e. less than 0.3 ppm and generally to less than b 0.1 ppm, and then gradually increased. The total throughput of water was measured at the point at which the soluble iron concentration had increased to 1 ppm. The following is a summary of the results of such tests In Example 7, the filtrate soluble iron content vs. throughput was as follows:

TABLE III

| EXAMPLE 7 | |
|---|---|
| Total Throughput (Gals.) | Soluble Iron Content (ppm) |
| 0 | .06 |
| 3.8 | .32 |
| 7.6 | .05 |
| 11.4 | .22 |
| 15.2 | .28 |
| 19.0 | .60 |
| 22.8 | 1.20 |

The pH of the filtrate for all of the aforedescribed examples was always less than 9.

EXAMPLE 9

In this test magnesium peroxide was used as a precoat on the filter media of Example 1. The amount of peroxide used was an amount equal to the amount used in the filter media of Example 7. The throughput was only 9 gallons before 1 ppm soluble iron content was reached in the filtrate —42% of the capacity of the filter media of Example 7.

EXAMPLE 10

A 12 inch diameter filter cartridge, similar to that shown in FIGS. 1 and 2, having 9 filter cells was tested in a private residence. The cartridge contained 11 square feet of filter area. The filter media used in the cartridge was comprised of:

| (a) | KAMLOOPS | 30% |
| (b) | Refined Pulp | 3% |

| | (−250 CSF) | |
|---|---|---|
| (c) | Magnesium Peroxide particulate (100% active) | 7% |
| (d) | Perlite 4106 | 60% |
| (e) | WESOL PA cationic colloidal silica | 6% |

The inlet iron level was about 2 ppm (1 ppm soluble and 1 ppm insoluble) and the filtrate about 0.05 ppm for 23,000 gallons throughput. The pH of the inlet water was from about 6.5 to 7.3. The pH of the filtrate water was at all times no greater than about 0.2 higher than the inlet pH (after initial flushout).

EXAMPLE 11

Another filter cartridge, substantially identical to that used in Example 10, was tested in another private residence. The inlet water contained about 5 ppm soluble iron. The filtrate contained about 0.05 soluble iron for about 5,000 gallons. The pH of the inlet water was 7.2 and the pH of the filtrate was about 8.50 to 8.70 (after initial flushout).

EXAMPLE 12

Another filter cartridge substantially identical to that used in Example 10 was tested in another private home. The inlet water contained about 3.0 ppm insoluble iron only. The filtrate contained about 0.05 ppm for about 12,000 gallons. The pH of the inlet water was about 5.7 to 6.3 and the pH of the filtrate was about 5.7 to 6.4 (after initial flushout).

COMPARATIVE EXAMPLES 13–39

Tests similar to that of Examples 1 through 8 were performed using oxidizing agents other than calcium or magnesium peroxide. The following results were obtained.

TABLE IV

OXIDATION AND REMOVAL OF SOLUBLE IRON

| EXAMPLE | KAMLOOPS (WT. %) | Refined Pulp 250 CSF (WT. %) | OXIDIZING AGENT TYPE | QUAN. | PARTICULATE TYPE | QUAN. | CHARGE MODIFYING AGENT TYPE | QUANTITY (WT. %) | TOTAL THROUGHPUT (GALS.) |
|---|---|---|---|---|---|---|---|---|---|
| 13 | 20% | 10% | activated carbon treated with $CO_2$ | 70% | — | — | 1884* | 5% | <0.1 |
| 14 | 20% | 10% | activated carbon treated with $Na_4P_2O_7$ | 70% | — | — | 1884 | 5% | 3.0 |
| 15 | 20% | 10% | activated carbon treated with $Na_3PO_4$ | 70% | — | — | 1884 | 5% | 3.5 |
| 16 | 20% | 10% | activated carbon treated with 0.1 grams $KMnO_4$ | 35% | Perlite 436 | 35% | 1884 | 5% | 2.6 |
| 17 | 20% | 10% | activated carbon treated with 0.4 grams $KMnO_4$ | 35% | Perlite 436 | 35% | 1884 | 5% | 8.0 (Manganese contamination-black staining filtrate) |
| 18 | 20% | 10% | activated carbon treated with 2% nitric acid | 35% | Perlite 436 | 35% | 1884 | 5% | <0.1 |
| 19 | 20% | 10% | activated carbon treated with 5% NaHClO | 35% | Perlite 436 | 35% | 1884 | 5% | 1.0 |
| 20 | 20% | 10% | activated carbon treated with $K_2Cr_2O$ | 35% | Perlite 436 | 35% | 1884 | 5% | 1.0 |
| 21 | 20% | 10% | activated carbon treated with 35% $H_2O_2$ | 35% | Perlite 436 | 35% | 1884 | 5% | <0.1 |
| 22 | 20% | 10% | activated carbon treated with perchlorous acid | 35% | Perlite 436 | 35% | 1884 | 5.0 | 1.0 |
| 23 | 20% | 10% | activated carbon treated with $NaClO_3$ | 35% | Perlite 436 | 35% | 1884 | 5.0 | .5 |
| 24 | 20% | 10% | activated carbon treated with $K_2S_2O_8$ | 35% | Perlite 436 | 35% | 1884 | 5.0 | 1.0 |
| 25 | 28% | 2% | MgO | 50% | activated carbon | 20% | Wesol PA | 10% | 7.0 (pH greater than 10.5) |

TABLE IV-continued

| | | | OXIDATION AND REMOVAL OF SOLUBLE IRON | | | | | |
|---|---|---|---|---|---|---|---|---|
| EXAMPLE | KAMLOOPS (WT. %) | Refined Pulp 250 CSF (WT. %) | OXIDIZING AGENT TYPE | QUAN. | PARTICULATE TYPE | QUAN. | CHARGE MODIFYING AGENT TYPE | QUANTITY (WT. %) | TOTAL THROUGH-PUT (GALS.) |
| 26 | 28% | 2% | $ZrO_2$ | 40% | activated carbon | 30% | Wesol PA | 10% | <0.1 |
| 27 | 28% | 2% | $ZnO_2$ | 35% | Perlite 436 | 35% | Wesol PA | 10% | <0.1 |
| 28 | 28% | 2% | ZnO | 35% | Perlite 436 | 35% | Wesol PA | 10% | 0 |
| 29 | 28% | 2% | $TiO_2$ | 35% | activated carbon | 35% | Wesol PA | 10% | <0.1 |

EXAMPLE 30

REMOVAL AND INACTIVATION OF MICROORGANISMS

Test bacteria (*E. coli, P. aeroginosa, P. cepacia* and *S. marcens*) were obtained from cultures grown overnight in 50 ml. trypticase soy broth in a 250 ml. Erlenmeyer flask on a shaker table at 37° C. The *E. coli* organisms were assayed on EMB agar plates and the remaining species were assayed on trypticase soy agar plates at 37° C.

*Coliphage MS*-2 was assayed with its host *E. coli B* ATCC 15597, using the plaque forming unit (PFU) method. Trypticase soy agar plates were used for the assay. *Poliovirus type* 1 (L5c) was grown and assayed by the PFU technique in the BGM cell line.

*Simian rotavirus* was grown and assayed in the MA-104 cell line.

To assess the degree of inactivation of microorganisms on filter surfaces, test microorganisms were suspended in dechlorinated tapwater (pH 7.5-8.0) and divided into 10 ml. aliquots. Aliquots were passed through a Zeta Plus 50S filter media sold by AMF Cuno, Meriden, Conn. This filter media is a charge modified filter media. This filter was used as a control. The charge modifying agent was Hercules 1884 polyamido polyamine epichlorhydrin cationic charge modifier. The other aliquots were passed through an essentially similar filter containing magnesium peroxide produced in accordance with Example B, having an average particle size of 10-20 microns (the Experimental Filter). The filter contained about 60% by weight $MgO_2$ (50% active ingredient.) Each aliquot contained approximately $10^{10}$ microorganisms, i.e. virus or bacteria, per ml. After the adsorption of the test microorganism on the filter media, the open ends of the filter holders were sealed with a film to prevent loss of moisture on the filters. All filters were kept at room temperature during the study period. The amount of organisms retained by each filter was determined by assay of the filtrates.

The bacteria were eluted by forcing the elution media in the reverse direction (backwashing) from the initial filtration. This was found to elute the maximum number of bacteria retained by the filters. To determine the degree of inactivation of the microorganisms on the filters, 10 ml of elution media were passed through the Control and Experimental Filters over a given period of time.

In the case of bacteria, trypticase soy broth pH 10 was used as an eluate and for the viruses, 2% bovine serum albumin pH 10 was used as an eluate. The eluates were immediately neutralized by dilution in a Tris buffer, $(HOCH_2)_3 CNH_2$, to prevent any inactivating effects of high pH on the test organism. Sets of filters were eluted at 0 hr, 2 hr, 4 hr, 24 hr, and on occasion at 48 hr. The degree of inactivation was assessed by comparing the decrease in number of microorganisms in the eluates obtained after different time periods. The amount of *coliphage MS-2, poliovirus type* 1 (L5c), and *E. Coli* eluted from the Control Filter usually remained unchanged over 24 hrs. or declined slightly On the other hand, *P aeroginosa, S. marcens,* and *P. cepacia* tended to increase in number.

The results obtained in accordance with the foregoing assays are summarized in FIGS. 3-9.

As the results in FIGS. 3-9 show, generally more than 99% of the microorganism species were killed after adsorption upon the filter surfaces and a sufficient period of contact. Although the present invention is not to be limited to any particular theory or mechanism by which inactivation of the microorganisms is achieved, it has been speculated that inactivation is due to the destruction of bacteria cell walls through oxidation which damages the vital enzymatic species required for biological life.

While there have been described what are presently believed to be examples of preferred embodiments of the invention, those skilled in the art will realize that changes and modifications may be made without departing from the spirit of the invention, and it is intended to claim all such changes and modifications as fall within the scope of the claimed invention.

What is claimed is:

1. A filter media for oxidizing and removing soluble iron contained in an aqueous fluid comprising an amount of particulate immobilized in a substantially inert porous matrix, at least a portion of the particulate having on its surface magnesium peroxide ($MgO_2$), the amount of peroxide on the particulate surface is sufficient to oxidize the soluble iron when the fluid is passed through the filter media, to form an insoluble iron which is captured by the media.

2. A filter media for removing and inactivating microorganisms contained in a fluid comprising an amount of particulate immobilized in a substantially inert porous matrix, at least a portion of the particulate having on its surface magnesium peroxide ($MgO_2$), the amount of peroxide on the particulate surface is sufficient to inactivate the microorganisms captured by the filter media when the fluid is passed through the filter media.

3. The filter media of claim 1 or 2, wherein the amount of the peroxide in the filter media is at least about 1% by weight of the media.

4. The filter media of claim 3, wherein the amount of peroxide in the filter media is from about 5% to about 70% by weight of the media.

5. The filter media of claim 1 or 2, wherein at least a portion of the particulate is a particulate filter aid having adsorbed thereon the peroxide.

6. The filter media of claim 5, wherein the filter aid is activated carbon.

7. The filter media of claim 5, wherein the filter aid is perlite.

8. The filter media of claim 5, wherein the filter aid is diatomaceous earth.

9. The filter media of claim 1 or 2, wherein the porous matrix comprises a self-bonding matrix of cellulose fibers.

10. The filter media of claim 9, wherein the cellulose fiber includes a minor proportion of a beaten cellulose fiber having a Canadian Standard Freeness of between about +100 and −600 ml.

11. The filter media of claim 10, wherein the amount of particulate is at least about 50% by weight of the media.

12. The filter media of claim 1 or 2, wherein the filter media has an electropositive potential.

13. The filter media of claim 11, wherein the electropositive potential is provided by modifying the surface of the particulate or matrix with a surface modifying amount of a melamine formaldehyde cationic colloid.

14. The filter media of claim 11, wherein the electropositive potential is provided by modifying the surface of the particulate or matrix with a surface modifying amount of an inorganic cationic colloidal silica.

15. The filter media of claim 11, wherein the electropositive potential is provided by modifying the surface of the particulate or matrix with a surface modifying amount of a polyamido-polyamine epichlorhydrin cationic resin.

16. The filter media of claim 1 or 2, wherein the filter media is a filter sheet.

17. The filter media of claim 1 or 2, wherein the filter media is a porous tubular filter element.

18. A method for oxidizing and removing soluble iron contained in an aqueous fluid comprising passing the fluid through the filter media of claim 1.

19. A method of removing and inactivating microorganisms contained in a fluid comprising passing the fluid through the filter media of claim 2.

20. A filter media for oxidizing and removing soluble iron contained in an aqueous fluid comprising an amount of particulate immobilized in a substantially inert porous matrix, at least a portion of the particulate having on its surface calcium peroxide ($CaO_2$), the amount of peroxide on the particulate surface is sufficient to oxidize the soluble iron when the fluid is passed through the filter media, to form an insoluble iron which is captured by the media.

21. A filter media for removing and inactivating microorganisms contained in a fluid comprising an amount of particulate immobilized in a substantially inert porous matrix, at least a portion of the particulate having on its surface calcium peroxide ($CaO_2$), the amount of peroxide on the particulate surface is sufficient to inactivate the microorganisms captured by the filter media when the fluid is passed through the filter media.

22. The filter media of claim 20 or 21, wherein the amount of the peroxide in the filter media is at least about 1% by weight of the media.

23. The filter media of claim 22, wherein the amount of peroxide in the filter media is from about 5% to about 70% by weight of the media.

24. The filter media of claim 20 or 21, wherein at least a portion of the particulate filter is a particulate filter aid having adsorbed thereon the peroxide.

25. The filter media of claim 24, wherein the filter aid is activated carbon.

26. The filter media of claim 24, wherein the filter aid is perlite.

27. The filter media of claim 24, wherein the filter aid is diatomaceous earth.

28. The filter media of claim 20 or 21, wherein the porous matrix comprises a self-bonding matrix of cellulose fibers.

29. The filter media of claim 28, wherein the cellulose fiber includes a minor proportion of a beaten cellulose fiber having a Canadian Standard Freeness of between about +100 and −600 ml.

30. The filter media of claim 29, wherein the amount of particulate is at least about 50% by weight of the media.

31. The filter media of claim 20 or 21, wherein the filter media has an electropositive potential.

32. The filter media of claim 31, wherein the electropositive potential is provided by modifying the surface of the particulate or matrix with a surface modifying amount of a melamine formaldehyde cationic colloid.

33. The filter media of claim 31, wherein the electropositive potential is provided by modifying the surface of the particulate or matrix with a surface modifying amount of an inorganic cationic colloidal silica.

34. The filter media of claim 31, wherein the electropositive potential is provided by modifying the surface of the particulate or matrix with a surface modifying amount of a polyamido-polyamine epichlorhydrin cationic resin.

35. The filter media of claim 20 or 21, wherein the filter media is a filter sheet.

36. The filter media of claim 20 or 21, wherein the filter media is a porous tubular filter element.

37. A method for oxidizing and removing soluble iron contained in an aqueous fluid comprising passing the fluid through the filter media of claim 20.

38. A method of removing and inactivating microorganisms contained in a fluid comprising passing the fluid through the filter media of claim 21.

* * * * *